(12) United States Patent
Song et al.

(10) Patent No.: US 6,278,814 B1
(45) Date of Patent: Aug. 21, 2001

(54) 1×N OPTICAL WAVELENGTH-DIVISION DEMULTIPLEXER ALIGNMENT APPARATUS AND 1×N OPTICAL WAVELENGTH-DIVISION DEMULTIPLEXER THEREFOR

(75) Inventors: Hyung-seung Song, Yongin; Yeong-gyu Lee, Suwon; Hyoun-soo Kim, Sungnam, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/449,519

(22) Filed: Nov. 29, 1999

(30) Foreign Application Priority Data

Nov. 27, 1998 (KR) .................................................. 98-51262

(51) Int. Cl.⁷ .............................. G02B 6/28; H04J 14/02
(52) U.S. Cl. .............................. 385/24; 385/37; 385/46; 385/50; 359/124; 359/127; 359/130
(58) Field of Search .................................. 385/24, 37, 14, 385/46, 50, 16, 22; 359/115, 124, 127, 130

(56) References Cited

U.S. PATENT DOCUMENTS 5,940,555 * 8/1999 Inaba et al. .............................. 385/24
6,069,990 * 5/2000 Okawa et al. ...................... 385/24 X
6,175,675 * 1/2001 Lee et al. ................................ 385/50
6,192,170 * 2/2001 Komatsu ................................. 385/15

* cited by examiner

*Primary Examiner*—Phan T. H. Palmer
(74) *Attorney, Agent, or Firm*—Robert E. Bushnell, Esq.

(57) ABSTRACT

A 1×N optical wavelength-division demultiplexer alignment apparatus including a 1×N optical wavelength-division demultiplexer including an input waveguide, N output waveguides and a plurality of alignment waveguides positioned around the input and output waveguides, for demultiplexing signal light and supplying the demultiplexed signal light to the N output waveguides if the signal light has a wavelength in a communication wavelength region, and for supplying the signal light to the alignment waveguides if the signal light has wavelengths outside the communication wavelength region. A single optical fiber block has a single optical fiber to transmit the signal light to the 1×N optical wavelength-division demultiplexer, a multiple optical fiber block having N optical fibers connected to output sides of the N waveguides and alignment optical fibers connected to output sides of the alignment waveguides.

19 Claims, 2 Drawing Sheets

100  102  104

106

1×N OPTICAL WAVELENGTH-DIVISION DEMULTIPLEXER ALIGNMENT APPARATUS AND 1×N OPTICAL WAVELENGTH-DIVISION DEMULTIPLEXER THEREFOR

CLAIM OF PRIORITY

This application makes reference to, incorporates the same herein, and claims all benefits accruing under 35 U.S.C. § 119 from an application entitled 1×N OPTICAL WAVELENGTH-DIVISION DEMULTIPLEXER ALIGNMENT APPARATUS AND 1×N OPTICAL WAVELENGTH-DIVISION DEMULTIPLEXER THEREFOR earlier filed in the Korean Industrial Property Office on the 27th day of November 1999, and there duly assigned Ser. No. 98-51262, a copy of which is annexed hereto.

BACKGROUND OF THE INVENTION

1. Technical Field

The present invention relates to an alignment apparatus for a 1×N optical wavelength-division demultiplexer using a wavelength division demultiplexing coupler, and more particularly, relates to an apparatus for aligning an optical wavelength-division demultiplexer and an optical fiber block.

2. Related Art

Alignment of an optical waveguide device such as an optical wavelength-division demultiplexer falls under the packaging process which is a finishing step in fabricating an optical waveguide device. In order to increase fabrication efficiency, it is important to reduce the time required for connection between an optical waveguide device and an optical fiber by easily aligning the device with the optical fiber.

In order to install an optical waveguide-type device chip in a network, alignment and adhesion with optical fibers must be realized.

Wavelength characteristics per chip fabricated for an optical waveguide device may differ. Thus, it is necessary to know accurate wavelength characteristics before alignment and adhesion. Accordingly, a plurality of light sources for generating light having different wavelengths may be necessary. Thus, the system may become complicated and may require a large number of components.

I have found that it would be desirable to use a new and improved 1×N optical wavelength-division demultiplexer alignment apparatus that solves the problems of the related art.

SUMMARY OF THE INVENTION

It is an objective of the present invention to solve the above-described problems.

It is a further object of the present invention to provide an alignment apparatus for a 1×N optical wavelength-division demultiplexer, for performing wavelength-independent alignment by outputting light having a wavelength in a region other than a communication region to alignment waveguides positioned at the outer portion of the optical wavelength-division demultiplexer to align a the optical wavelength-division demultiplexer and the optical fiber block.

Accordingly, to achieve the above objectives and others, there is provided a 1×N optical wavelength-division demultiplexer alignment apparatus including a 1×N optical wavelength-division demultiplexer including an input waveguide, N output waveguides and a plurality of alignment waveguides positioned around the input and output waveguides, for demultiplexing signal light and supplying the demultiplexed signal light to the N output waveguides if the signal light has a wavelength in a communication wavelength region, and for supplying the signal light to the alignment waveguides if the signal light has wavelengths outside a communication wavelength region, a single optical fiber block having a single optical fiber to transmit the signal light to the 1×N optical wavelength-division demultiplexer, a multiple optical fiber block having N optical fibers connected to output sides of then waveguides and alignment optical fibers connected to output sides of the alignment waveguides, a measuring unit for measuring the intensity of the light output from the alignment optical fibers, and a controller for finely controlling the alignment between the single optical fiber block and the alignment waveguides and between the alignment waveguides and the multiple optical fiber block.

The 1×N optical wavelength-division demultiplexer may further include a wavelength-division demultiplexing coupler for supplying the signal light to output waveguides if the wavelength of the input signal light is in a communication wavelength region, and supplying the signal light to alignment waveguides if the wavelengths of the input signal light is outside the communication wavelength region.

To achieve these and other objects in accordance with the principles of the present invention, as embodied and broadly described, the present invention provides an alignment apparatus, comprising: a 1×N optical wavelength-division demultiplexer having an input waveguide, a plurality of N output waveguides, and a plurality of alignment waveguides positioned around said input and output waveguides; when signal light has wavelengths in a predetermined wavelength region, said 1×N optical wavelength-division demultiplexer demultiplexing the signal light and supplying demultiplexed signal light to said N output waveguides; when the signal light has wavelengths not in said predetermined wavelength region, said 1×N optical wavelength-division demultiplexer supplying the signal light to said alignment waveguides; a single optical fiber block having a single optical fiber transmitting the signal light to said 1×N optical wavelength-division demultiplexer; a multiple optical fiber block having a plurality of N optical fibers connected to output sides of said N output waveguides, and having alignment optical fibers connected to output sides of said alignment waveguides; a measuring unit measuring intensity of light output from said plurality of alignment optical fibers; and a controller controlling alignment between said single optical fiber block and said plurality of alignment waveguides, and controlling alignment between said plurality of alignment waveguides and said multiple optical fiber block.

To achieve these and other objects in accordance with the principles of the present invention, as embodied and broadly described, the present invention provides an alignment apparatus, comprising: a 1×N optical wavelength-division demultiplexing unit demultiplexing signal light into a plurality of N beams according to wavelength when wavelengths of the signal light correspond to a communication wavelength region; a plurality of alignment waveguides being positioned around said 1×N optical wavelength-division demultiplexing unit, the signal light being output through said plurality of alignment waveguides when wavelengths of the signal light do not correspond to said communication wavelength region; and a wavelength-division demultiplexing coupler supplying the signal light to output waveguides when wavelengths of the signal light do correspond to said communication wavelength region, said wavelength-division demultiplexing coupler supplying the signal light to said plurality of alignment waveguides when wavelengths of the signal light do not correspond to said communication wavelength region.

To achieve these and other objects in accordance with the principles of the present invention, as embodied and broadly described, the present invention provides an apparatus, comprising: a 1×N optical wavelength-division demultiplexer having an input waveguide, a plurality of N output waveguides, and a plurality of alignment waveguides positioned adjacent to said input and output waveguides; and said 1×N optical wavelength-division demultiplexer demultiplexing the signal light and supplying demultiplexed signal light to said N output waveguides when signal light has wavelengths in a predetermined wavelength region, said 1×N optical wavelength-division demultiplexer supplying the signal light to said alignment waveguides when the signal light has wavelengths not in said predetermined wavelength region.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being abroad, teaching disclosure directed to persons of skill in the appropriate arts, and not as limiting upon the present invention.

Figure 1A:
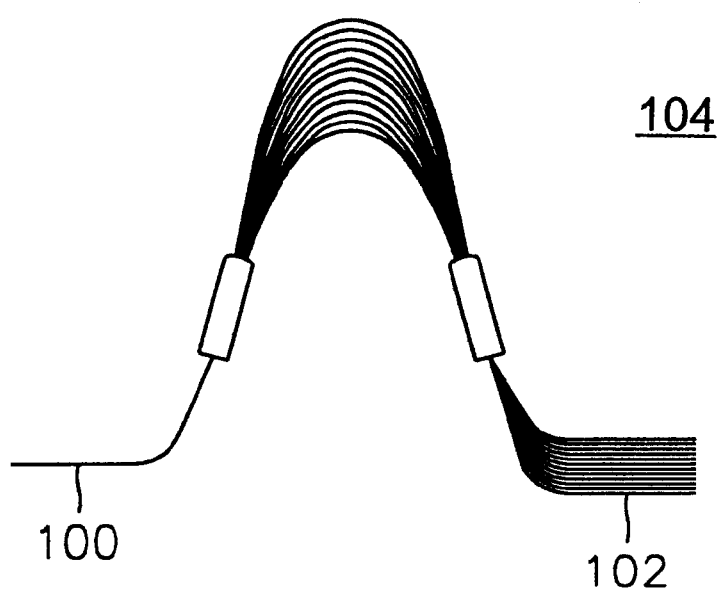
FIG. 1A is a schematic diagram of a 1×N optical wavelength-division demultiplexer.
Figure 1B:
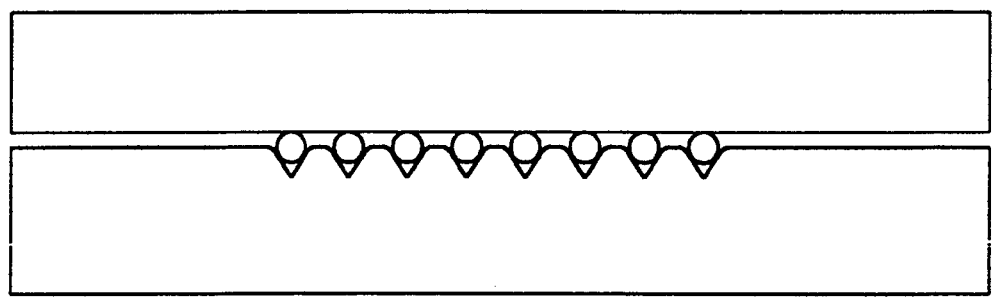
FIG. 1B shows an optical fiber block used for alignment at an output side of the 1×N optical wavelength-division demultiplexer shown in FIG. 1A.

FIG. 1A is a schematic diagram of a 1×N optical wavelength-division demultiplexer 104, for example, a 1×8 optical wavelength-division demultiplexer, and FIG. 1B shows an optical fiber block 106 used for alignment with an output side of the 1×8 optical wavelength-division demultiplexer shown in FIG. 1A.

Light generated in a light source (not shown) is incident into an input optical fiber to then be aligned with an input waveguide 100 of the optical wavelength-division demultiplexer shown in FIG. 1A. Output waveguides 102 of the optical wavelength-division demultiplexer are aligned with an optical fiber block 106 shown in FIG. 1B to allow light to be guided. The position at which the light is maximally guided is determined by finely adjusting the positions of the optical fiber and optical wavelength-division demultiplexer while measuring the intensity of the light output from two if outermost ports of the optical fiber block 106, and then the optical fiber and the optical wavelength-division demultiplexer are epoxy-adhered at the determined position.

An optical device such as the optical wavelength-division demultiplexer has wavelength characteristics. Thus, in order to realize the alignment and adhesion between an optical waveguide device and an optical fiber block, it is necessary to detect the optimum position at which fine alignment and wavelength characteristics are both satisfied.

Wavelength characteristics per chip fabricated for such an optical waveguide device may differ. Thus, it is necessary to know accurate wavelength characteristics before alignment and adhesion. Accordingly, a plurality of light sources for generating light having different wavelengths may be necessary. Thus, the system may become complicated and requires a large number of components.

Figure 2:
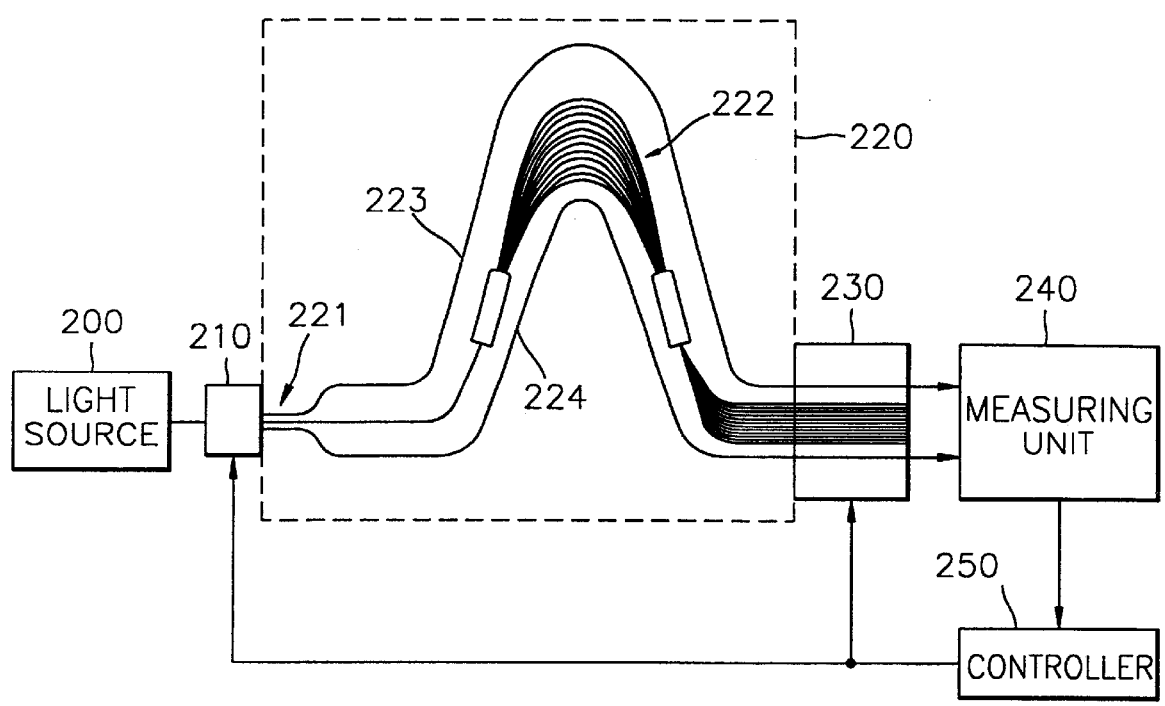
FIG. 2 is a schematic diagram of a 1×N optical wavelength-division demultiplexer alignment apparatus using an optical wavelength-division demultiplexer, in accordance with the principles of the present invention.

Referring to FIG. 2, a 1×N optical wavelength-division demultiplexer alignment apparatus includes a light source 200, a single optical fiber block 210, a 1×N optical wavelength-division demultiplexer 220, a multiple optical fiber block 230, and a controller 250. Here, let N be 8.

The 1×N optical wavelength-division demultiplexer 220 includes a wavelength-division demultiplexing (WDM) coupler 221, a 1×N optical wavelength-division demultiplexing unit 222, an outer alignment waveguide 223 and an inner alignment waveguide 224.

Figure 3:
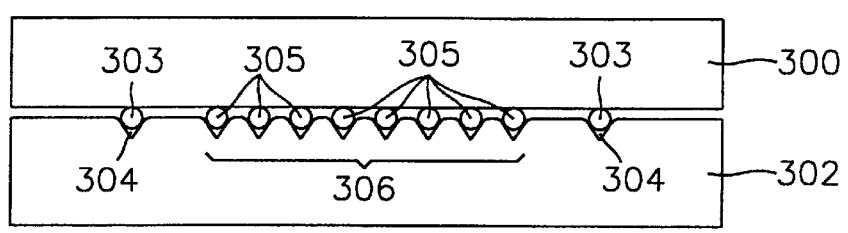
FIG. 3 is a schematic diagram of a multiple optical fiber block shown in FIG. 2, in accordance with the principles of the present invention.

The multiple optical fiber block 230 is shown in FIG. 3 and includes an upper body 300 and a lower body 302. The lower body 302 includes V-grooves 304 in which alignment optical fibers 303 are mounted, and V-grooves 306 in which N optical fibers 305 connected to output waveguides of the 1×N optical wavelength division demultiplexer 220 are mounted. Here, the number of the grooves 304 in which the alignment optical fibers 303 are mounted may be increased in the case where the 1×N optical wavelength-division demultiplexer 220 further includes curved or linear waveguides in addition to the outer and inner alignment waveguides 223 and 224. As the alignment optical fibers 303, general optical fibers which are not made in a ribbon or jumper cord are used and then removed after alignment and adhesion.

The 1×N optical wavelength-division demultiplexer alignment apparatus according to the present invention operates as follows. A light source 200 generates light having communication wavelengths in the 1550 nanometers (nm)region. The wavelength-division demultiplexing (WDM) coupler 221 supplies the light of 1550 nm wavelength region transmitted from the single optical fiber block 210 to output waveguides of the 1×N optical wavelength-division demultiplexing unit 222. The light of 1550 nm wavelength region is not transmitted to the outer and inner alignment waveguides 223 and 224 by the wavelength vision demultiplexing coupler 221.

During alignment, as the light source 200, a helium-neon (He—Ne) laser for generating light of wavelengths in a region other than communication wavelengths, for example, 633 nm wavelength regions, may be used. The wavelength-division demultiplexing coupler 221 supplies the alignment light having 633 nm wavelengths transmitted through the single optical fiber block 210 to the outer and inner alignment waveguides 223 and 224. In other words, since complete migration of the alignment light does not occur in the wavelength-division demultiplexing coupler 221, the alignment light is supplied to the outer and inner alignment waveguides 223 and 224.

The light supplied from the first and second waveguides 223 and 224 is output to the measuring unit 240 through the alignment optical fibers of the multiple optical fiber block 230. Here, the output alignment light is not necessarily in a high power level.

The measuring unit 240 measures the power level of the alignment light output from the alignment optical fibers.

The controller 250 adjusts the positions of the single optical fiber block 210, the 1×N optical wavelength-division demultiplexer 220 and the multiple optical fiber block 230 so that the power level of the alignment light measured by the measuring unit 240 is maximum.

The respective elements are adhered at the positions where the power level becomes maximum, and then the alignment optical fibers are removed.

According to the present invention, during alignment of a 1×N optical wavelength-division demultiplexer, since the light having wavelengths outside a communication wavelength region is output to outer waveguides of the 1×N optical wavelength-division demultiplexer to thus realize wavelength-independent alignment, it is not necessary to know accurate wavelength characteristics of individual optical devices. Therefore, easy and fast alignment and adhesion between optical fibers and an optical device can be realized and the system configuration becomes simplified.

The foregoing paragraphs describe the details of an alignment apparatus for a 1×N optical wavelength-division demultiplexer using a wavelength division demultiplexing coupler, and more particularly, describe the details of an apparatus for aligning an optical wavelength-division demultiplexer and an optical fiber block by providing alignment waveguides in the outer portion of a 1×N optical wavelength-division demultiplexer.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An alignment apparatus, comprising:
   a 1×N optical wavelength-division demultiplexer having an input waveguide, a plurality of N output waveguides, and a plurality of alignment waveguides positioned around said input and output waveguides;
   said 1×N optical wavelength-division demultiplexer demultiplexing the signal light and supplying demultiplexed signal light to said N output waveguides, when signal light has wavelengths in a predetermined wavelength region;
   said 1×N optical wavelength-division demultiplexer supplying the signal light to said alignment waveguides, when the signal light has wavelengths not in said predetermined wavelength region;
   a single optical fiber block having a single optical fiber transmitting the signal light to said 1×N optical wavelength-division demultiplexer;
   a multiple optical fiber block having a plurality of N optical fibers connected to output sides of said N output waveguides, and having alignment optical fibers connected to output sides of said alignment waveguides;
   a measuring unit measuring intensity of light output from said plurality of alignment optical fibers; and
   a controller controlling alignment between said single optical fiber block and said plurality of alignment waveguides, and controlling alignment between said plurality of alignment waveguides and said multiple optical fiber block.

2. The apparatus of claim 1, said 1×N optical wavelength-division demultiplexer further comprising a wavelength-division demultiplexing coupler supplying the signal light to said plurality of N output waveguides when wavelength of the input signal light is in said predetermined wavelength region.

3. The apparatus of claim 2, further comprising said wavelength-division demultiplexing coupler supplying the signal light to said alignment waveguides when wavelengths of the input signal light is not in said predetermined wavelength region.

4. The apparatus of claim 1, further comprising said multiple optical fiber block having a plurality of grooves, said N optical fibers and said alignment optical fibers being mounted in said plurality of grooves.

5. The apparatus of claim 1, further comprising said predetermined wavelength region corresponding to a communication wavelength region.

6. The apparatus of claim 5, further comprising said communication wavelength region corresponding to wavelengths in region of 1550 nanometers.

7. The apparatus of claim 6, further comprising wavelengths in region of 633 nanometers not corresponding to said communication wavelength region.

8. An alignment apparatus, comprising:
   a 1×N optical wavelength-division demultiplexing unit demultiplexing signal light into a plurality of N beams according to wavelength when wavelengths of the signal light correspond to a communication wavelength region;
   a plurality of alignment waveguides being positioned around said 1×N optical wavelength-division demultiplexing unit, the signal light being output through said plurality of alignment waveguides when wavelengths of the signal light do not correspond to said communication wavelength region; and
   a wavelength-division demultiplexing coupler supplying the signal light to output waveguides when wavelengths of the signal light do correspond to said communication wavelength region, said wavelength-division demultiplexing coupler supplying the signal light to said plurality of alignment waveguides when wavelengths of the signal light do not correspond to said communication wavelength region.

9. The apparatus of claim 8, further comprising:
   a single optical fiber block having a single optical fiber transmitting the signal light to said 1×N optical wavelength-division demultiplexing unit; and
   a multiple optical fiber block having a plurality of N optical fibers connected to output sides of said output waveguides, and having alignment optical fibers connected to output sides of said alignment waveguides.

10. The apparatus of claim 9, further comprising said multiple optical fiber block having a plurality of grooves, said optical fibers and said alignment optical fibers being mounted in said plurality of grooves.

11. The apparatus of claim 10, further comprising:
a measuring unit measuring intensity of light output from said plurality of alignment optical fibers; and
a controller controlling alignment between said single optical fiber block and said plurality of alignment waveguides, and controlling alignment between said plurality of alignment waveguides and said multiple optical fiber block.

12. The apparatus of claim 8, further comprising:
a measuring unit measuring intensity of light output from said alignment waveguides; and
a controller controlling alignment of signal light at said input and output sides of said 1×N optical wavelength-division demultiplexing unit and at said input and output sides of said wavelength-division demultiplexing coupler.

13. The apparatus of claim 12, further comprising said controller controlling said alignment in response to said measuring unit.

14. The apparatus of claim 8, further comprising:
a measuring unit measuring intensity of light output from said alignment waveguides; and
a controller controlling alignment of signal light in response to said measuring unit.

15. An apparatus, comprising:
a 1×N optical wavelength-division demultiplexer having an input waveguide, a plurality of N output waveguides, and a plurality of alignment waveguides positioned adjacent to said input and output waveguides; and
said 1×N optical wavelength-division demultiplexer demultiplexing the signal light and supplying demultiplexed signal light to said output waveguides when signal light has wavelengths in a predetermined wavelength region, said 1×N optical wavelength-division demultiplexer supplying the signal light to said alignment waveguides when the signal light has wavelengths not in said predetermined wavelength region.

16. The apparatus of claim 15, further comprising said predetermined wavelength region corresponding to wavelengths in region of 1550 nanometers.

17. The apparatus of claim 15, further comprising wavelengths in region of 633 nanometers not corresponding to said predetermined wavelength region.

18. The apparatus of claim 15, further comprising:
a single optical fiber block having a single optical fiber transmitting the signal light to said 1×N optical wavelength-division demultiplexer;
a multiple optical fiber block having a plurality of N optical fibers connected to output sides of said N output waveguides, and having alignment optical fibers connected to output sides of said alignment waveguides;
a measuring unit measuring intensity of light output from said plurality of alignment optical fibers; and
a controller controlling alignment between said single optical fiber block and said plurality of alignment waveguides, and controlling alignment between said plurality of alignment waveguides and said multiple optical fiber block, said controller performing said controlling in response to said measuring unit.

19. The apparatus of claim 18, further comprising:
said 1×N optical wavelength-division demultiplexer including a wavelength-division demultiplexing coupler supplying the signal light to said plurality of N output waveguides when wavelengths of the input signal light are in said predetermined wavelength region; and
said wavelength-division demultiplexing coupler supplying the signal light to said alignment waveguides when wavelengths of the input signal light are not in said predetermined wavelength region.

* * * * *